Patented June 13, 1950

2,511,297

UNITED STATES PATENT OFFICE 2,511,297

AIR BLOWING OF HYDROCARBON ALKOXY SILANES AND PRODUCTS

John B. Rust, Montclair, and Charles A. MacKenzie, East Orange, N. J., assignors, by direct and mesne assignments, of one-half to Montclair Research Corporation, a corporation of New Jersey, and one-half to Ellis Foster Company, a corporation of New Jersey No Drawing. Application October 26, 1945, Serial No. 624,952

22 Claims. (Cl. 260—46.5)

This invention relates to the production of synthetic elastomers from organo silicon esters, to both the methods and resulting products and to their utilization.

Among the objects of the present invention is the production of elastomers or rubber-like materials from organo silicon esters by simple and economic procedures.

Further objects include the production of the desired properties in such elastomers by heat treatment and in other ways.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, organo silicon esters are subjected to aeration at elevated temperatures to produce polymerized materials soluble in organic solvents or at a gel stage or just short of such gel stage and are then subjected to a heating or curing operation to develop the desired properties of elastomeric character including extensibility, elasticity, resilience, etc.

The organo silicon esters employed may be of any type which are capable of being polymerized by such air treatment, particularly at elevated temperatures, and include particularly alkyl alkoxy silicanes and related materials which will be utilized to illustrate the invention below, although aryl alkoxy silicanes and cyclic non-aromatic alkoxy silicanes and silanes may also be treated in accordance with the present invention. Furthermore, such materials may be treated in the presence of other polymerizable compounds including silicochloroform derivatives, particularly hydrolyzed silicochloroform derivatives as well as hydrolyzable organo silicon halides containing no hydrogen to carbon bond, which copolymerizing materials may be present to modify the properties of the ultimate products obtained. Illustrating the preferred materials that may be treated in accordance with the present invention there may be particularly mentioned di-n-butyl diethoxy silicane, di-n-butyl di-(β-chloroethoxy) silicane, dimethyl di-(β-chloroethoxy) silicane, dimethyl diethoxy silicane, diethyl diethoxy silicane, dibutyl diethoxy silicane, mono-n-butyl triethoxy silane, partially polymerized diethyl diethoxy silane, di-n-butyl diethoxy silane, monomethyl tri-n-butoxy silane, monomethyl triethoxy silane, monophenyl triethoxy silane, monocyclohexyl triethoxy silane, N-butyl triethoxy silane, and as exemplifying copolymerizing materials that may be employed there may be utilized a mixture of monobutyl triethoxy siliconate with tetra ethyl orthosilicate, or a mixture of monobutyl triethoxy siliconate with dibutyl diethoxy siliconate, or a mixture of monobutyl triethoxy siliconate and trisbeta chloroethoxy silane. Examples illustrating the utilization of these materials in the production of the desired products will be given below.

The organo substituent groups in the stated derivatives are preferably alkyl as illustrated above but may be alphyl, aryl, alkynyl, alkenyl, aralkyl, alkanyl, olefinyl, and non-aromatic carbocyclic groups and the like, illustrated by methyl, ethyl, propyl, butyl, amyl, hexyl, heptyl, octyl, vinyl, allyl, butenyl, cyclohexyl, benzyl, phenyl, tolyl, xenyl, chlorphenyl, styryl, radicals from acetylene, methyl acetylene, propyl acetylene, phenyl acetylene, and the like.

In carrying out the present invention the stated derivatives are subjected to the action of oxygen or air at elevated temperatures, as for example, temperatures of from 50 to 250° C. and the aeration carried out until polymerization to the desired extent has been obtained, as for example, in the production of viscous or sticky syrups, either just short of the gel stage or at the gel stage, etc., but the product at this stage is desirably soluble in solvents such as carbon tetrachloride, ethyl bromide, toluene, and other organic solvents. Such treatment by heat and blowing with air is desirably carried out simultaneously in producing the polymerized materials. Ordinarily at this stage the polymerization product may be extremely viscous or gel-like in character. The time of heat treatment will vary depending on the temperatures employed and the products undergoing treatment but may generally be indicated to be of the order of from 10 minutes to 6 hours. The blowing operation need not be carried out at a single range of temperature only, but successive stages of temperature treatment varying between such stages may be employed for varying periods at such different temperatures, as for example, where the blowing operation is carried out in several steps with different temperatures employed in the several steps desirably utilizing higher temperatures in the later stages of treatment and there may be two or more such stages of different treatments depending on the nature of the product undergoing treatment and the ultimate polymerization product desired at this stage. The time treatment in multistage temperature processes may vary again within the limits set forth above depending on the characteristics of the product sought from the particular material undergoing treatment.

The polymerization or partial polymerization product is then subjected to treatment to develop the particular elastomeric properties desired, as for example, extensibility, elasticity, resiliency, etc., and such treatments may be carried out in various ways. The aerated product may be subjected directly to a heating or curing operation to develop the desired properties at temperatures, for example, of from 100 to 250° C. Or the aerated product may be milled on, for example, regular rubber milling equipment or combinations of such milling operations with heat treatment may be utilized either simultaneously or successively.

Various fillers may if desired be incorporated at this stage as well as various antioxidants. As exemplary of the fillers that may be mentioned such fillers as zinc oxide, carbon black, titanium oxide, magnesia, alumina, magnesium carbonate, asbestos, and the like may be employed, and of course, combination of fillers may be utilized. As antioxidants any of the usual antioxidants may be employed including particularly the aromatic amines and phenols, and their various derivatives employed as antioxidants.

The material either filled or unfilled, may be worked on the rolls or other equipment until a suitable workable mass is obtained. This mass may then be cut, stamped, shaped or otherwise treated to particular dimensions and subjected to further curing by heat treatment at temperatures indicated, the time of such treatment varying with particular properties it is desired to develop in the material. By such treatments, rubbery materials are readily obtained possessing varying degrees of rubberiness and resilience, elasticity, etc. Articles ranging from hard rubbers to soft rubbers may be produced in this way.

In the preferred process, air is blown through the desired organo silicon ester undergoing treatment, the latter being desirably in liquid condition at the time of treatment. Materials which are liquid at the temperature at which the treatment is carried out may thus be directly treated. If desired, solvents may be present and generally such solvents should be inert if by-products and by-reactions are to be avoided.

As the oxidizing agent, dry air is preferable, but pure oxygen or oxygen mixed with various inert gases, or ozone, and other oxidizing agents may be employed. The oxidation may be carried out solely by bubbling air through the heated material or catalysts may be present such catalysts, for example, as vanadium pentoxide, tin vanadate, and the like. No catalysts are, however, essential in carrying out the present invention.

Catalysts of the type of driers such as lead naphthenate, etc. may be utilized during the aeration procedure and at the elevated temperatures employed may produce insoluble infusible masses possessing considerable elasticity by a single step of aeration treatment under the conditions indicated. Examples of such effect will be given below.

Products resulting from the present invention may be utilized in the form of lacquers, films, or molded products.

In the following examples which illustrate the invention, the parts are by weight unless otherwise indicated.

*Example 1.*—Di-n-butyl diethoxy silicane was placed in a Pyrex container under a reflux condenser and heated by means of an oil bath while air, previously dried by passage through concentrated sulfuric acid and anhydrous calcium chloride, was introduced in a stream of fine bubbles. The heating bath was maintained for 3 hours at 170–180° C. and for 6 hours at 190–200° C.

A clear light-yellow viscous syrupy liquid just short of the gel stage was obtained through which further air bubbles could not be passed. The resin was soluble in carbon tetrachloride and ethyl bromide.

A. A sample of the resin was milled together with substantial amounts of titanium and zinc oxides and a small percentage of benzoyl peroxide. Heating for one hour at 120° C. gave a product possessing a soft rather porous interior and a weak rubbery skin.

B. Milling another sample with carbon black, titanium dioxide and benzoyl peroxide gave a gray putty. A ball was formed of this putty, and was heated for one hour at 100° C. followed by two hours at 120° C. The result was a hard material possessing some resilience.

C. Another portion of the original light sticky viscous syrup was allowed to stand at room temperature for two weeks. It slowly changed to a clear, light-yellow gel which was still slightly sticky. Some of the material was masticated and then rolled into a ball. Heat treatment for two hours at 140° C. yielded a rubbery resilient product.

*Example 2.*—Di-n-butyl di-(β-chloroethoxy) silicane was aerated while being heated as in Example 1. The heating was for three hours at 170–180° C. and then for nine hours at 190–200° C. The product obtained was a dark brown sticky mass at about the gel stage. This was dissolved in ethyl bromide to give a clear viscous solution, which was poured into a watch glass. After standing two weeks, the solvent had evaporated off and the material was converted into a dark brown disk of a tacky, but distinctly rubbery, material.

A. A strip about 1/8" x 1/2" x 2" was cut from the disk and heated in an oven for 2 hours at 100° C. followed by one hour at 140° C. It lost its tack and solubility in organic solvents, but increased in elasticity.

B. A portion of the original unheated tacky rubbery material was milled well with a small amount of titanium dioxide to give a white doughy product which was slightly tacky. This was then rolled into a rod shape about two inches long and 1/16 inch in diameter. The rod was heated for one hour at 100° C. and then one hour at 140° C. The final product was a white smooth cylinder of rubbery elastic material with a flesh-like feel.

C. Duplicating the above procedure but substituting long-fibered asbestos for the titanium dioxide, gave a brown coarse rubbery cylinder after two hours at 140° C.

In Example 2 B the amount of titanium dioxide may vary from 30 to 60% by weight; while in example 2 C the asbestos was used in amounts ranging from 10 to 50% by weight.

*Example 3.*—Dimethyl di - (β - chloroethoxy) silicane was aerated as in Example 1. The heating schedule was three hours at 150–160° C., one hour at 170–180° C., and finally seven hours at 190-200° C. A viscous sticky resin was obtained which was soluble in organic solvents.

A. This was compounded and milled with titanium dioxide to give a thin white putty which cured to a weak material at 140° C. after about 5 hours.

B. On standing in air for one week, the original resin set to a coherent rubbery mass possessing marked extensibility and elasticity.

*Example 4.*—Dimethyl diethoxy silicane was aerated as in Example 1 during twenty hours' heating at 70-80° C. This rather fluid material on standing in a closed test-tube at room temperature for one week changed to a sticky brown viscous resin soluble in carbon tetrachloride. On standing open to the air at room temperature for two weeks longer, it set to a clear, light brown rubbery gel. This was heated for two hours at 120° C. and then milled together with some carbon black. The resulting black dough was formed into a ball about ¾″ in diameter and heat-treated for 4½ hours at 130° C. to yield a product possessing some resiliency.

*Example 5.*—Diethyl diethoxy silicane was aerated as in Example 1. The heating was for four hours at 140-150° C. followed by twelve hours at 170-180° C. The viscous syrup obtained was dissolved in toluene and the solution exposed for one week to air at room temperature. The solvent had evaporated off, leaving a colorless sticky gel-like mass. Milled with titanium dioxide, it gave a white sticky fluid dough-like mass. This was spread on a tin plate and heated for 2½ hours at 100° C. to give a coherent porous slightly sticky material possessing some resiliency.

*Example 6.*—Dibutyl diethoxy silicane containing 1% lead as lead naphthenate was aerated as in Example 1 with slow heating up to 180° C. After one hour of heating at 180° C., the material suddenly set to an insoluble infusible mass possessing considerable elasticity.

Having thus set forth our invention, we claim:

1. The method of preparing organo silicon polymers which comprises blowing dry air through an alkoxy silane having from two to three alkoxy groups attached to silicon, the remaining valences of the silicon being satisfied by monovalent hydrocarbon groups, the silane being in liquid condition, at a temperature of from 50-250° C. until a soluble polymerized resinous material in substantial amount is obtained.

2. The method as set forth in claim 1 which includes the step of curing the product resulting from the method of claim 1 at a temperature of 100-250° C.

3. An insoluble, air polymerized alkoxy silane containing a hydrocarbon group attached directly to silicon produced by the method of claim 2.

4. The method of preparing organo silicon polymers which comprises blowing dry air through an alkoxy silane having from two to three alkoxy groups attached to silicon, the remaining valences of the silicon being satisfied by monovalent hydrocarbon groups, the silane being in liquid condition, at a temperature of from 50-250° C. until a soluble polymerized resinous material in substantial amount is obtained, incorporating a filler in such product, and curing the resulting filled material at a temperature of from 100-250° C.

5. The method of claim 4 wherein the filler is milled with the soluble polymerized material.

6. The method as set forth in claim 4, in which the filler is milled with the soluble polymerized material, and the hydrocarbon groups attached to silicon are alkyl.

7. A cured, air polymerized alkoxy silane containing a hydrocarbon group attached directly to silicon produced by the method of claim 4.

8. A method as set forth in claim 1, wherein the hydrocarbon groups attached to silicon are alkyl.

9. The method of preparing organo silicon polymers which comprises blowing dry air through an alkoxy silane having from two to three alkoxy groups attached to silicon, the remaining valences of the silicon being satisfied by monovalent hydrocarbon groups, the silane being in liquid condition, at a temperature of from 50-250° C. until an insoluble resilient resinous product is obtained.

10. The method as set forth in claim 9, wherein a drier is present.

11. A soluble, air polymerized alkoxy silane containing a hydrocarbon group attached directly to silicon produced by the method of claim 1.

12. The method of claim 1, in which the silicon derivative is a dialkyl dialkoxy silane.

13. An air polymerized dialkyl dialkoxy silane produced by the method of claim 12.

14. The method of claim 1, in which the silicon derivative is a monoalkyl trialkoxy silane.

15. An air polymerized monoalkyl trialkoxy silane produced by the method of claim 14.

16. The method of claim 1, in which the silicon derivative is dimethyl diethoxy silane.

17. An air polymerized dimethyl diethoxy silicon silane produced by the method of claim 16.

18. The method of claim 1, in which the silicon derivative is diethyl diethoxy silane.

19. An air polymerized diethyl diethoxy silicon silane produced by the method of claim 18.

20. The method of claim 1, in which the silicon derivative is dibutyl diethoxy silane.

21. An air polymerized dibutyl diethoxy silane produced by the method of claim 20.

22. The method as set forth in claim 1 in which the silane is dimethyl diethoxy silane and in which the temperature is from 70-80° C. until a viscous liquid polymerized material is obtained.

JOHN B. RUST.
CHARLES A. MacKENZIE.

REFERENCES CITED

The following references are of record in the file of this patent:

UNITED STATES PATENTS

| Number | Name | Date |
|---|---|---|
| 2,273,891 | Pollack et al. | Feb. 24, 1942 |
| 2,386,466 | Hyde | Oct. 9, 1945 |
| 2,392,713 | Wright et al. | Jan. 8, 1946 |
| 2,394,642 | Strain et al. | Feb. 12, 1946 |
| 2,396,692 | Garner | Mar. 19, 1946 |
| 2,397,727 | Daudt | Apr. 2, 1946 |
| 2,399,687 | McNabb | May 7, 1946 |
| 2,410,737 | Jenny | Nov. 5, 1946 |
| 2,415,389 | Hunter et al. | Feb. 4, 1947 |

OTHER REFERENCES

Landenburg, Berichte, vol. 6, 1873, pp. 379 and 380.

Landenburg, Annalin, vol. 173, 1874, pp. 143 and 149.

Rochow, Chemistry of the Silicones, Wiley 1946, pp. 43 and 44.

Chemical and Engineering News, vol. 24, No. 9, May 10, 1946, pp. 1233 and 1234.

Certificate of Correction

Patent No. 2,511,297                                              June 13, 1950

JOHN B. RUST ET AL.

It is hereby certified that errors appear in the printed specification of the above numbered patent requiring correction as follows:

Column 6, lines 34 and 35, and 38 and 39, respectively, strike out the word "silicon";

and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*